April 3, 1945.  H. M. MAGID  2,372,679
COATED SHEET PRODUCT
Filed May 25, 1942  2 Sheets-Sheet 1
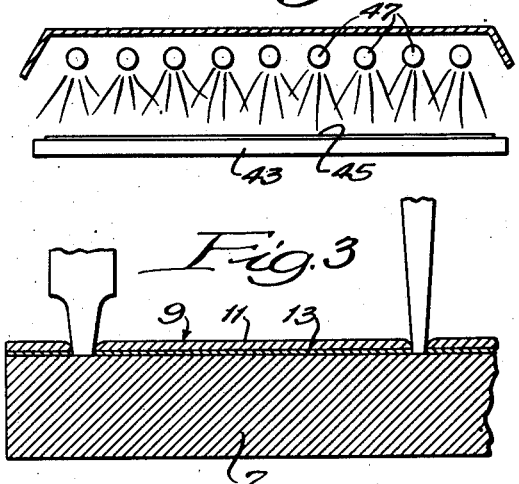
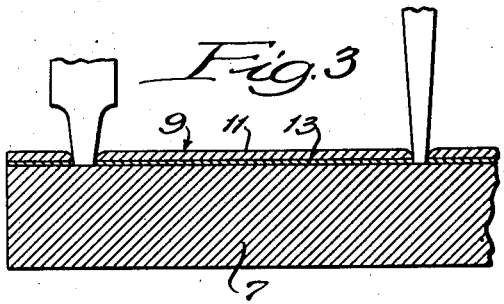
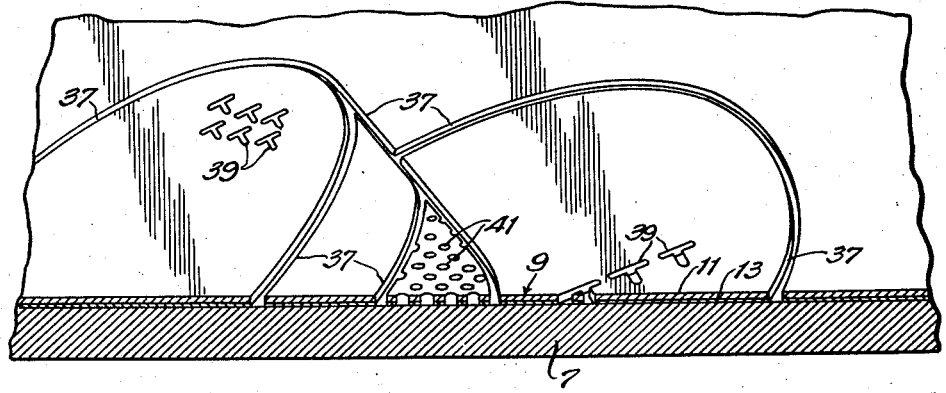
Inventor:
Harry M. Magid,
By Soans, Pond & Anderson
Attorneys.

Inventor:
Harry M. Magid,
By Soans, Pond & Anderson
Attorneys.

Patented Apr. 3, 1945

2,372,679

UNITED STATES PATENT OFFICE 2,372,679

COATED SHEET PRODUCT

Harry M. Magid, Chicago, Ill.

Application May 25, 1942, Serial No. 444,318

4 Claims. (Cl. 41—46)

My invention relates broadly to the art of printing and has particular reference to processes and materials for producing transparencies suitable for making etched printing and lithographic surfaces by photographic transfer procedures. In part the present application is a continuation of my prior application Serial No. 259,979 which was filed on March 6, 1939.

Etched printing surfaces both of the relief, offset, and the intaglio type are widely used in the printing art. In fact, such surfaces probably constitute the most widely used means for reproducing drawings, sketches, advertising copy, or the like comprising combinations of text material and sketches, etc. However, despite the wide use of etched printing surfaces, the process followed in making such surfaces is not only a costly and time consuming one, but can be carried out only by highly skilled labor.

To a substantial extent, these disadvantages result from the fact that the present processes require that the copy which is to be reproduced must be photographed as an intermediate step in the preparation of an etched printing surface. In the relief and offset lithography processes, the negative produced by this photographing of the copy is used as a transparency for exposing the sensitized resist which, when developed, covers the surface to be etched during the etching operation. In intaglio it is necessary to use a positive transparency for exposing the sensitized resist, and this involves a further intermediate step.

The principal object of the present invention, therefore, is to make possible the elimination of this photographing of the copy which is to be reproduced by the etched printing surface, which photographing constitutes an essential step of the prior art processes. The particular solution of the problem which constitutes my invention consists in the provision of a novel sheet product comprising a transparent backing sheet upon which there has been placed a light-impervious coating which can be readily displaced or removed by drawing, sketching, impressing, typing, or printing thereon to produce a transparency suitable for use in exposing directly a resist covering for a printing surface.

I am, of course, aware that sheet products of this general character have been suggested by prior inventors. The prior art products have, however, failed to meet the requirements of the art, especially in that the coatings applied to these products could not be readily displaced or removed to produce sharp outlines, an essential requirement in the reproduction of drawings, sketches, or type characters. Also, it has been found impractical, if not in fact impossible, when using the prior art products to reproduce type or similar characters by simply typing or impressing such characters on the sheet as can be done with the product of my invention.

These and other of the important characteristics and advantages of my invention and certain preferred embodiments thereof will be made more apparent by reference to the accompanying drawings. In the drawings, Figure 1 is a plan view of a coated sheet product in accordance with the present invention;

Figure 2 is a diagrammatic view illustrating how a prepared sheet, such as is illustrated in Figure 1, may be used for exposing the resist coated surface of an unetched printing plate;

Figure 3 is an enlarged fragmentary view on the general line 3—3 of Figure 1 illustrating the manner in which the coating of the sheet product of my invention will be displaced or removed by the application of type or a stylus thereto;

Figure 4 is an enlarged fragmentary view on the line 4—4 of Figure 1;

Figure 5:
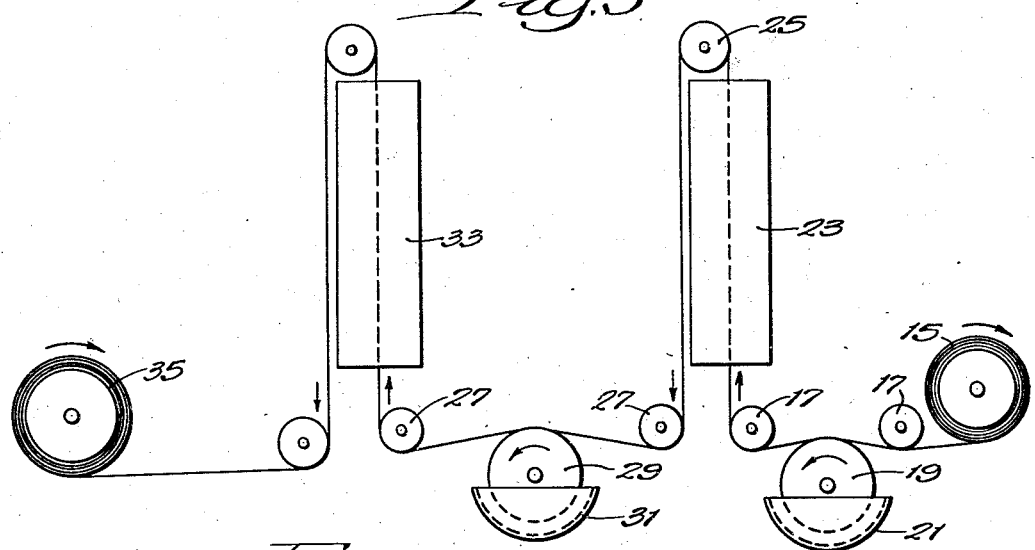
Figure 5 is a diagrammatic view illustrating one method of manufacturing the sheet product of my invention.

Referring to the drawings, the sheet product of my invention includes a backing sheet 7 of transparent sheet material which serves as a support for the light-impermeable, displaceable coating 9. The coating 9 preferably comprises two film-like layers, an outer or protective layer 11 and an inner layer 13; at least the inner layer is light-impermeable. The backing sheet 7 may be of cellulose acetate or a derivative thereof, Celluloid or other cellulose nitrate derivative, ethyl cellulose or a derivative thereof, rubber derivatives such as the product sold under the trade name "Pliofilm," synthetic resins such as the product sold under the trade name "Vinylite," or any similar transparent material, and for certain particular applications it will be found that the coating 9 may be satisfactorily applied to glass or to paper sheets. When using a backing sheet of Celluloid or one of the other cellulose base materials, I prefer that such sheet shall have a thickness within the range of about .0008 to .090 inch.

The coating material, which is, of course, the essence of the invention, consists of a uniform mixture of a suitable adhesive binder, usually colloidal in nature, which is tempered with a non-drying oil, wax, or other plasticizing material. The coating would appear to be properly described as a tempered adhesive colloid. The inner layer 13 of the coating material includes a pigment for the purpose of rendering it impervious to light, and in order that it may be easily removed or displaced by a drawing instrument or type, the inner layer 13 includes a sufficiently high percentage of plasticizing material to render it relatively soft at all times. The tests which I have made indicate that the inner layer of the coating material should have a thickness within the range of about .00010 to .0010 inch, the thinner coatings apparently being more satisfactory.

The protective or outer layer 11 of the coating, except as hereinafter noted will usually constitute a tempered adhesive, probably colloidal in nature, consisting of a uniform mixture of an adhesive, colloidal or similar binder tempered with a non-drying plasticizer. The protective layer is preferably applied after the inner layer 13 has been dried and receives its increased strength by virtue of a substantial decrease in the percentage weight of the non-drying plasticizer relative to the weight of the binder. Also, it is desirable that any pigment used in the protective layer 11 shall be light colored in order to facilitate drawing on the sheet or reading text matter which may be imprinted thereon. The protective layer 11 is preferably somewhat thicker than the inner layer 13 which it covers, but it is conceivable that in certain instances it may be desirable to utilize a protective layer which is of about the same or of somewhat less thickness than the inner layer. Tests indicate that most satisfactory results can be accomplished if the thickness of the protective layer is within the range of from about .00010 to .00125 inch.

To facilitate the obtaining of these very thin film-like coating layers, the coating material is preferably thinned by dissolving it in a suitable, evaporable solvent prior to the applying operation, and is applied to the backing sheet in the liquid state. Both water soluble coating materials and coating materials which are soluble in an organic solvent such as alcohol or toluol have been used with good success.

One particularly satisfactory method of applying the coating material is illustrated diagrammatically in Figure 5. In this figure, a supply roll of cellulose acetate sheet or other backing material is illustrated at 15. The end of the sheet carried on this roll is conducted, by means of a pair of guide or couch rolls 17, over a coating roll 19 which dips into a pan or trough 21 containing a liquid solution of the coating material. The density and viscosity of the coating solution are, of course, controlled to obtain a coating of the desired thickness. After receiving this coat, the sheet passes through an oven 23, which is preferably heated to a predetermined controllable temperature, where the solvent is evaporated.

The sheet then is conducted by other guide rolls 25 and 27 in contact with a second dip coating roll 29 which applies the protective coating from a liquid solution contained in a trough or pan 31, the density and viscosity of this solution being likewise controlled to produce a coating of the desired thickness. The coated sheet is then passed through a second oven 33, which is likewise preferably heated to a predetermined controllable temperature, for the purpose of drying the protective layer. After the drying is accomplished, the finished sheet may be taken up on a supply roll, such as is indicated at 35.

It will be apparent that other types of coating apparatus may be used for applying the coating films or layers to the backing sheet, and the disclosed arrangement is intended to be merely illustrative. The only requirement is that the coating shall be applied as a more or less even, continuous film over the entire sheet, and the drying must be adequate to set or harden the intermediate coating before the protective coating is applied.

With reference to the composition of the coating material, I have found that various types of materials, classifiable generally as adhesive colloids, may be used as the binder. These materials include cellulose acetate, cellulose nitrate, ethyl cellulose, benzyl cellulose, albumen, casein, vinyl compounds, various natural and synthetic resins, natural and synthetic rubbers and rubber resins, shellac, phthalic anhydride compounds, hydrogenated methyl abietate, gums, such as ester gums and even certain of the modified starches. Also, gelatin may be used, although the use of a gelatin as a binder with certain types of sheet materials such as cellulose acetate or cellulose nitrate sheets requires that the surface of the sheet shall be first treated, as with acetic acid, or other comparable material, in order that the gelatin will adhere thereto. Unless the binder has a natural affinity for the backing sheet it will be found very difficult to obtain even coatings.

There are three types of plasticizing materials, classifiable generally as non-drying plasticizers, which may be mixed with the binder to produce the displaceable or removable coating of my invention. The first of these includes the natural non-drying, non-tackying oils such as castor oil, soya bean oil, corn oil, peanut oil, rape seed oil, olive oil, palm oil, cotton seed oil, fish oils, various of the highly refined mineral oils, saturated fatty acids such as oleic acid and the fatty acids derived from linseed oil and palmitic oils, and certain of the halogenated mineral oils sold under the trade name of "Halowax" oils. The second important group of plasticizing materials for mixing with the binder includes such compounds as dibutyl phthalate, di-ethyl phthalate, tricresyl phosphate, tri-phenyl phosphate, and tri-acetin.

In addition to the non-drying oils and organic plasticizers listed above, the following materials sometimes generally classified as waxes may be used as a plasticizer or setting agent for the binder material: Chlorinated naphthalene, Japan wax, paraffin, spermacetti, synthetic waxes of the type sold by the Du Pont Company under the trade name "Opal" wax, beeswax, refined naphthalene, tallow, stearic acid, the fatty alcohols or sterols, certain of the normally solid halogenated hydro carbons sold under the trade name "Halowax," and practically all of the materials sold under the trade name of "Arochlor" (chlorinated diphenyl).

While the use of a two layer coating of the general composition previously described is the preferred form of the invention, it is possible in certain instances to modify the composition of the outer or protective layer. Especially it is possible by the use of high melting point, non-brittle waxes (waxes having a melting point in excess of about 145° F.) such as the synthetic "Opal" wax, certain of the "Halowaxes," and to a lesser extent modified petroleum waxes, to provide an outer layer which although it does not contain any binder at all is particularly useful for certain purposes.

The high melting point wax coating is preferably applied by putting the wax in solution, with or without the addition of pigment and the wax layer should be applied over a coating which contains both binder and plasticizer, as described above. There appears to be a union with possible absorption of binder between the wax of the outer layer and the binder of the inner layer which produces an outer coating having a surface hardness which is substantially equal to that of outer coatings of the normally preferred type consisting of binder-plasticizer mixtures. This hard wax coating gives reasonable protection to the inner layer and offers good resistance to abrasion. It has the particular advantage that very clear, sharp outlines are obtained when the coating is displaced by a stylus or by typewriting thereon.

The addition of a small percentage of liquid plasticizer to the wax solution before application to the inner layer will sometimes improve the displaceability characteristics of the coating. In connection with the use of a wax-only outer layer, brittle waxes such as carnauba wax do not appear to give good results.

It is also possible under certain circumstances to use an outer layer which consists only of a binder. Substantially all of the adhesive colloid binders named in the foregoing, and especially the cellulose derivative adhesives, have a definite affinity for substantially all of the named plasticizers. Hence, when one of these binders in solution, clear or pigmented, with slight or no modification, is spread over a coating layer containing both binder and plasticizer to form a protective layer, some plasticizing of the protective layer will result. An outer protective layer formed by the use of unplasticized coating material will not produce as clear sharp lines on drawings, lettering, or illustrations made with a stylus or other sharp pointed instrument as will be obtained by the use of an outer coating containing a plasticizer. However, for the taking of proofs of type forms or cuts by means of roller or platen pressure and in certain instances in typewriter typing, the application of suitable solvents or heat will temporarily soften the outer or even both layers of the coating for a sufficient time to permit the taking of clear sharp proofs or the obtaining of clear sharp outlines by the typewriter characters.

As specified examples of my invention, liquid coating solutions having a composition within the ranges specified below may be used for the initial coating layer:

| | Per cent |
|---|---|
| Shellac | 7 to 26 |
| Nitrol cellulose (cotton) (moistened with about 30% butyl alcohol) | 1 to 4 |
| Carbon black | 4 to 14 |
| Halowax oil No. 1000 or oleic acid | 32 to 20 |
| Alcohol (methyl) | 56 to 36 |

All percentages are by weight.

Coating solutions of the above composition when applied by a dip roll coater to a backing sheet of cellulose acetate (.0075 inch thick) moving at the rate of 15 feet per minute produced a film coating having a thickness of about .00025 inch.

When coating solutions having the proportions defined above are used for the initial coating layer, coating solutions having a composition within the ranges specified below may be used for the outer coating layer with very satisfactory results:

| | Per cent |
|---|---|
| Shellac | 10 to 20 |
| Nitro cellulose (moistened with about 30% butyl alcohol) | 1 to 4 |
| White pigment | 22 to 4 |
| Halowax oil No. 1000 or oleic acid | 22 to 10 |
| Alcohol (methyl) | 45 to 62 |

Varying the amount of the solvent—the methyl alcohol in the examples given above—constitutes a very satisfactory means for varying the thickness of the coating layers, and while the solvent percentages given in the foregoing examples will produce very satisfactory coatings, they may be increased or decreased within reason to meet the requirements of any particular situation.

It will be noted that the composition of the coating material used for the protective or outer layer, except in the special case of a high melting point wax outer layer as above described, includes a much lower percentage of plasticizing material than the coating for the inner or intermediate layer. This change in the proportions of the coating materials is responsible for the greatly increased strength of the protective layer. Coating solutions of the above compositions, when applied by a dip roll coater to the coated cellulose acetate described above produced an outer coating layer having a thickness of approximately .0003 inch at coating speeds of 15 feet per minute.

Tests made with the other named binders and non-drying plasticizers indicate that the composition of the coating solutions should be such that the inner coating layer includes an amount of plasticizer equivalent to about 125% to 575% of the weight of the binder, and that the outer or protective layer includes an amount of plasticizer equivalent to about 35% to 150% or more of the weight of the binder, these proportions referring more especially to liquid plasticizers. When wax is used as the plasticizer for the inner layer a substantially larger proportion of plasticizer to binder may be used.

In order to obtain best results in the finished product, it appears desirable that at least the inner coating when dry shall not have too great an affinity for the backing or supporting sheet. If the affinity between the coating and the backing sheet is too great it will be found difficult to remove the coating during the making of the transparency, and if the affinity is not sufficient the coating material will tend to smudge or peel. The degree of affinity can be readily controlled by selecting plasticizers which produce greater or less tempering of the binder and by varying the amount of binder.

Figure 6:
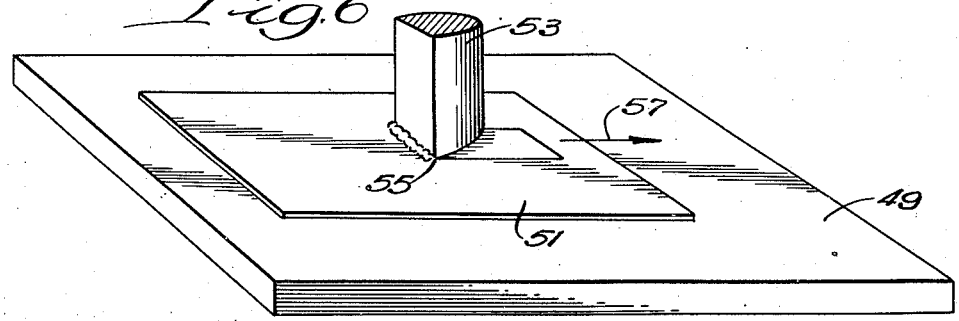
Figure 6 is a diagrammatic view illustrating the features and mode of operation of a testing apparatus developed particularly for use in conjunction with the product of the present invention.
Figure 7:
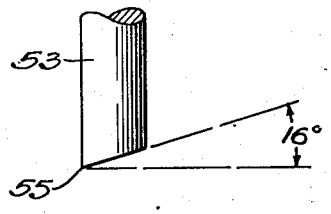
Figures 7 and 8 are detail views of the scraper knife forming a part of the testing apparatus illustrated in Figure 6.
Figure 8:
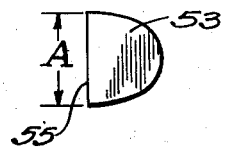

A convenient testing apparatus and procedure for measuring the affinity between the coating material and the backing sheet is illustrated in Figures 6, 7, and 8. This apparatus consists of a flat, smooth surfaced table or plate member 49 which is adapted to serve as a support for a sample of the coated sheet being tested, as indicated at 51. A scraper knife 53 having the general form illustrated in Figures 6 and 7 is supported, preferably by a resilient, anti-friction support means (not shown) so as to be longitudinally freely movable, up and down, in a direction normal to the table member 49. The scraper knife 53 is biased in the direction of the table member so as to direct the cutting edge 55 of the scraper knife 53 into the coated surface of the sample 51 with a predetermined, adjustably controllable force. The scraper knife 53 in the preferred form of the apparatus has a width or dimension A (Figure 8) of about $\frac{3}{32}$ of an inch, and is undercut as illustrated in Figure 7 at an angle of about 16°.

I have found that if the affinity of the coating for the backing sheet is such that a force of from about ½ to 7½ ounces, applied longitudinally of the scraper knife, is required to effect substantially complete removal of the coating from the backing sheet when the sheet sample 51 is moved slowly along the surface of the table support, as indicated by the arrow 57 in Figure 6, the coating will be satisfactory for the purposes of the present invention. If the affinity is greater than this, that is, if a pressure substantially greater than about 7½ ounces must be applied to the scraper knife 53 to effect the removal of the coating by the testing apparatus, it will be difficult to secure proper removal of the coating and satisfactory outlines during the ordinary use of the coated sheet. Similarly, if the coating has such a slight affinity for the backing sheet that it can be removed by the scraper knife 53 when that knife is biased toward the test sample with a force materially less than ½ ounce, the coating probably will not be sufficiently strong and permanent in use.

The preparation of transparencies suitable for use in exposing the sensitized resist coatings of an unetched printing surface by the use of the sheet product of the present invention is extremely simple. If the copy to be reproduced includes a sketch or drawing, this may be drawn directly on the coated sheet by the use of an ordinary pencil, a stylus, or other conventional artists' materials. It will be found that the two layers of the coating will separate from the backing sheet exactly in accordance with the lines drawn by the artist to produce sharp, clearly defined transparent areas such as are illustrated at 37 in Figure 4. Special shadings such as the Ben-Day patterns can be impressed on the original sketch by the artist with suitable screens or plates and proper pressure tools, thereby effecting very substantial savings in time and cost over the conventional practices. Two conventional Ben-Day patterns which have been so impressed on the coated sheet are illustrated in Figure 4 at 39 and 41.

Various artists who have used and worked with the sheet product of my invention have expressed the opinion that it is as easy, or easier, to work on than paper. The protective coating is sufficiently strong to permit the entire sketch or copy to be worked up by the use of crayons or soft pencils preparatory to actual removal of the coating. If an undesired line or area is drawn into the coating, it is a simple matter to apply a correction fluid which, in effect, restores the opacity of the original coating, or a patch of new material may be cemented over a scraped area and worked upon anew. The details of the coating fluid constitute, however, a separate invention.

In addition to being usable directly as a drawing medium, the sheet product of the present invention possesses another most important characteristic, the reason for which is not fully understood. Particularly, the sheet may be placed in a typewriter, preferably without a ribbon, and any typing which is then done will serve to evenly and cleanly displace the coating so as to produce a transparent area constituting a distinct, clear, and complete outline of the type. If the typewriter used is one of the self justifying type, it thus becomes possible to produce negative transparencies suitable for immediate use in making etched printing plates or rolls by simply typing up the copy. Before typing, it may be found desirable to soften temporarily the surface of the sheet. This may be done by applying a solvent for the coating to the sheet. As previously noted, when the outer layer consists of a high melting point, non-brittle, hard wax, and especially, when the outer layer consists of a high melting point, non-brittle, hard wax containing a small percentage of a liquid plasticizer, clear type impressions can be obtained without the use of any softening agent.

Moreover, it has been found that if the coating of the product of my invention is temporarily softened with a suitable agent and the sheet then is placed over a frame of set type, coated side downwardly, and a proof roller is rolled over the sheet, the type surfaces will likewise displace the coating material and produce an exact negative copy of the type surface outlines. As an alternative procedure the softening agent can be applied to the type surface, and in some instances heating of the type form sufficiently to displace the coating under platen pressure will have the same effect. The importance of this in making possible the rapid production of negatives suitable for immediate use in producing etched printing plates without involving any photographing of the copy is, of course, evident, and this inherent characteristic of the product of my invention is one of the most important aspects of the present invention.

The transparencies produced by the use of the sheet product of my invention may be used in exactly the same manner as the photographically produced transparencies of the prior art processes. The usual procedure will be to place the transparency face down over a copper or zinc plate having a sensitized resist by means of a suitable light source. This is illustrated diagrammatically in Figure 2 where 43 represents the unetched copper or zinc plate having a sensitized resist on its upper surface; 45 represents a transparency prepared in accordance with my invention, and 47 represents a light source. It will be understood that a vacuum printing frame may be used and that the transparency may be employed in connection with carbon tissue or similar resists which are ordinarily exposed before being applied to the surface of the plate or roll which is to be etched.

Since the coating of my invention can be applied to much thinner backing sheets or films than are practical for photographic emulsions, transparencies made from the sheet product of my invention are particularly adapted for making plates for offset lithography. This process inherently requires that the sensitized resist shall be printed with the transparency face up, with the result that it has heretofore been difficult to obtain as sharp outlines because of the film thickness.

In the foregoing I have disclosed the details of certain preferred embodiments of my invention. It will be evident, however, that this disclosure will suggest other coating compositions and other forms of the invention to those skilled in the art. It is my desire, therefore, that the accompanying claims shall be accorded the broadest possible construction consistent with the language appearing therein and the prior art.

I claim:

1. An article of the class described comprising a light-permeable film-like backing sheet, a light-impermeable two-layer coating on one surface of said sheet, the innermost of said layers comprising a uniform mixture of an adhesive colloidal binder and a non-drying plasticizer for maintaining softness in said layer and controlling adherence thereof to said backing, the outer layer being superposed on said innermost layer and also comprising a uniform mixture of an adhesive colloidal binder and a non-drying plasticizer, the plasticizer content of said outer layer being sufficient to render said layer non-brittle but being substantially less than that of said inner layer so as to make said outer layer substantially harder and more resistant to abrasion than said inner layer.

2. An article of the class described comprising a light-permeable film-like backing sheet, a light-impermeable two-layer coating on one surface of said sheet, the innermost of said layers comprising a uniform mixture of an adhesive colloidal binder and a non-drying plasticizer for maintaining softness in said layer and controlling adherence thereof to said backing, the outer layer being superposed on said innermost layer and comprising a high melting point wax which is non-brittle but harder and more resistant to abrasion than said innermost layer at normal atmospheric temperatures.

3. An article of the class described comprising a light-permeable film-like backing sheet, a light-impermeable two-layer coating on one surface of said sheet, the innermost of said layers comprising a uniform mixture of an adhesive colloidal binder and a non-drying plasticizer for maintaining softness in said layer and controlling adherence thereof to said backing, the outer layer being superposed on said innermost layer and comprising a film of an adhesive colloidal binder having a natural affinity for the plasticizer content of said innermost layer, whereby sufficient plasticizer is absorbed from said innermost layer by said outer layer to reduce the normal brittleness of the latter without excessively reducing its hardness, said outer layer being harder and more resistant to abrasion than said inner layer.

4. An article of the class described comprising a light-permeable film-like backing sheet, a light-impermeable two-layer coating on one surface of said sheet, the innermost of said layers comprising a uniform mixture of an adhesive colloidal binder and a non-drying plasticizer for maintaining softness in said layer and controlling adherence thereof to said backing, the outer layer being superposed on said innermost layer and comprising a film of an adhesive colloidal binder self-adherent to said innermost layer and harder and more resistant to abrasion than said layer.

HARRY M. MAGID.